United States Patent [19]
Bunch, Jr.

[11] Patent Number: 5,400,672
[45] Date of Patent: Mar. 28, 1995

[54] GEAR WITH INSET O-RING FOR SETTING BACKLASH

[76] Inventor: Earnest B. Bunch, Jr., 9619 N. 21st Dr., Phoenix, Ariz. 85021

[21] Appl. No.: 89,257

[22] Filed: Jul. 9, 1993

[51] Int. Cl.⁶ .................... F16H 55/16; F16H 55/18
[52] U.S. Cl. ........................ 74/409; 74/443; 74/461
[58] Field of Search ............. 74/409, 443, 461

[56] References Cited

U.S. PATENT DOCUMENTS

| | | | |
|---|---|---|---|
| 2,867,130 | 1/1959 | Moeller | 74/443 |
| 3,808,906 | 5/1974 | Bowers | 74/461 X |

FOREIGN PATENT DOCUMENTS

| | | | |
|---|---|---|---|
| 834799 | 3/1952 | Germany | 74/443 |
| 3144586 | 5/1983 | Germany | 74/461 |
| 1011626 | 12/1965 | United Kingdom | 74/443 |

*Primary Examiner*—Allan D. Herrmann
*Attorney, Agent, or Firm*—Tod R. Nissle

[57] ABSTRACT

A gear assembly reduces gear wear by insuring that the backlash of a pair of gears is at a desired setting. A first gear in the gear assembly resiliently displaces another gear outwardly away from the first gear to achieve a desired backlash setting.

6 Claims, 3 Drawing Sheets

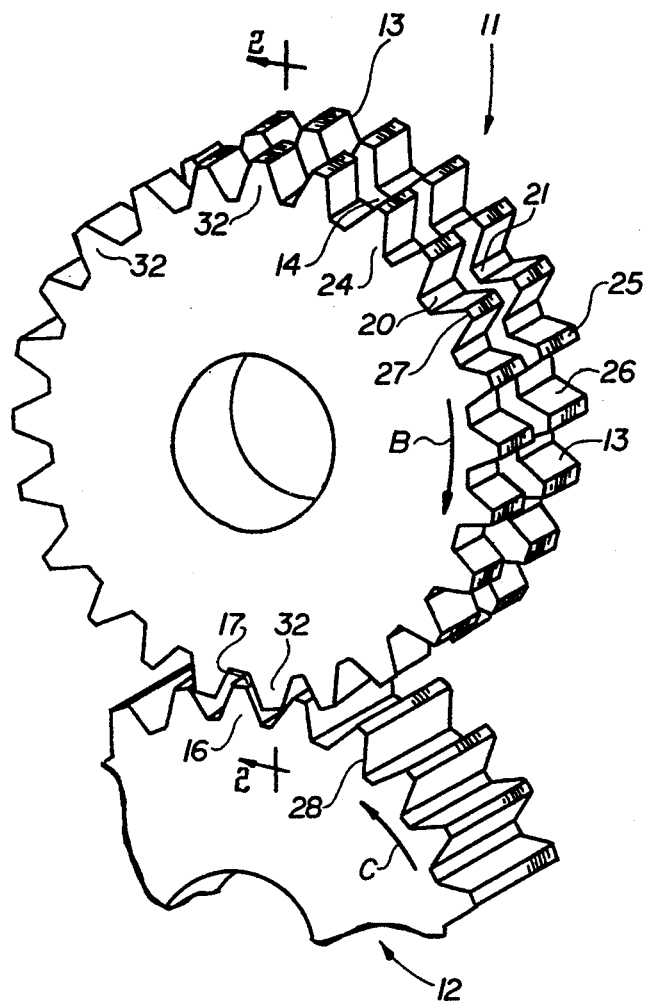
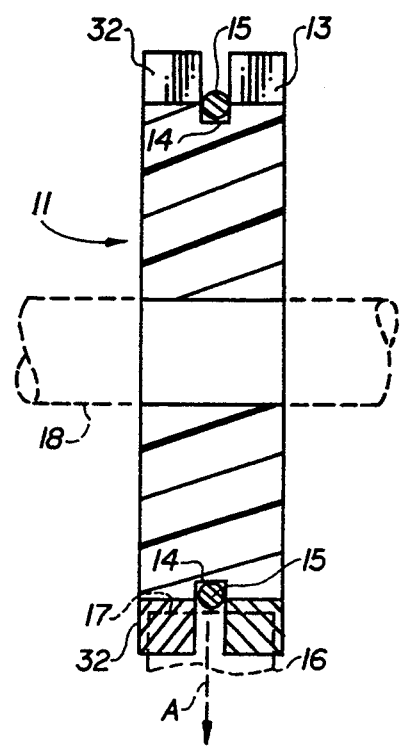
FIG. 1
FIG. 2

GEAR WITH INSET O-RING FOR SETTING BACKLASH

BACKGROUND OF THE INVENTION

1. Field of the Invention

This invention relates to a gear assembly.

More particularly, the invention relates to a gear assembly which reduces gear wear by insuring that the backlash between a pair of gears is at a desired setting.

In another respect, the invention relates to a gear assembly in which the first of a pair of meshed gears resiliently displaces the second of the pair of meshed gears outwardly away from the first gear to achieve a desired backlash setting.

2. Description of the Prior Art

Properly setting the backlash in a pair of meshed gears is critical. If the backlash is too small, the gear teeth can wear at a rapid rate. Unfortunately, setting the backlash in a pair of gears can be a time consuming task which, especially when attempted by one unskilled in the use of gear assemblies, is not properly accomplished. As a result, a pair of gears can be set with too little or too much backlash.

Accordingly, it would be highly desirable to provide gear assemblies which simplify the procedure for accurately setting the backlash between a pair of meshed gears.

Therefore, it is a principal object of the invention to provide improved gear assemblies.

A further object of the invention is to provide gear assemblies which facilitate the ready setting of the backlash between a pair of meshed gears.

BRIEF DESCRIPTION OF THE DRAWINGS

These and other, further and more specific objects and advantages of the invention will be apparent to those skilled in the art from the following detailed description thereof, taken in conjunction with the drawings, in which:

FIG. 1 is a perspective view illustrating a gear assembly constructed in accordance with the principles of the invention;

FIG. 2 is a side section view of one of the gears of FIG. 1 taken along section line 2—2 and further illustrating construction details thereof.

SUMMARY OF THE INVENTION

Figure 3:
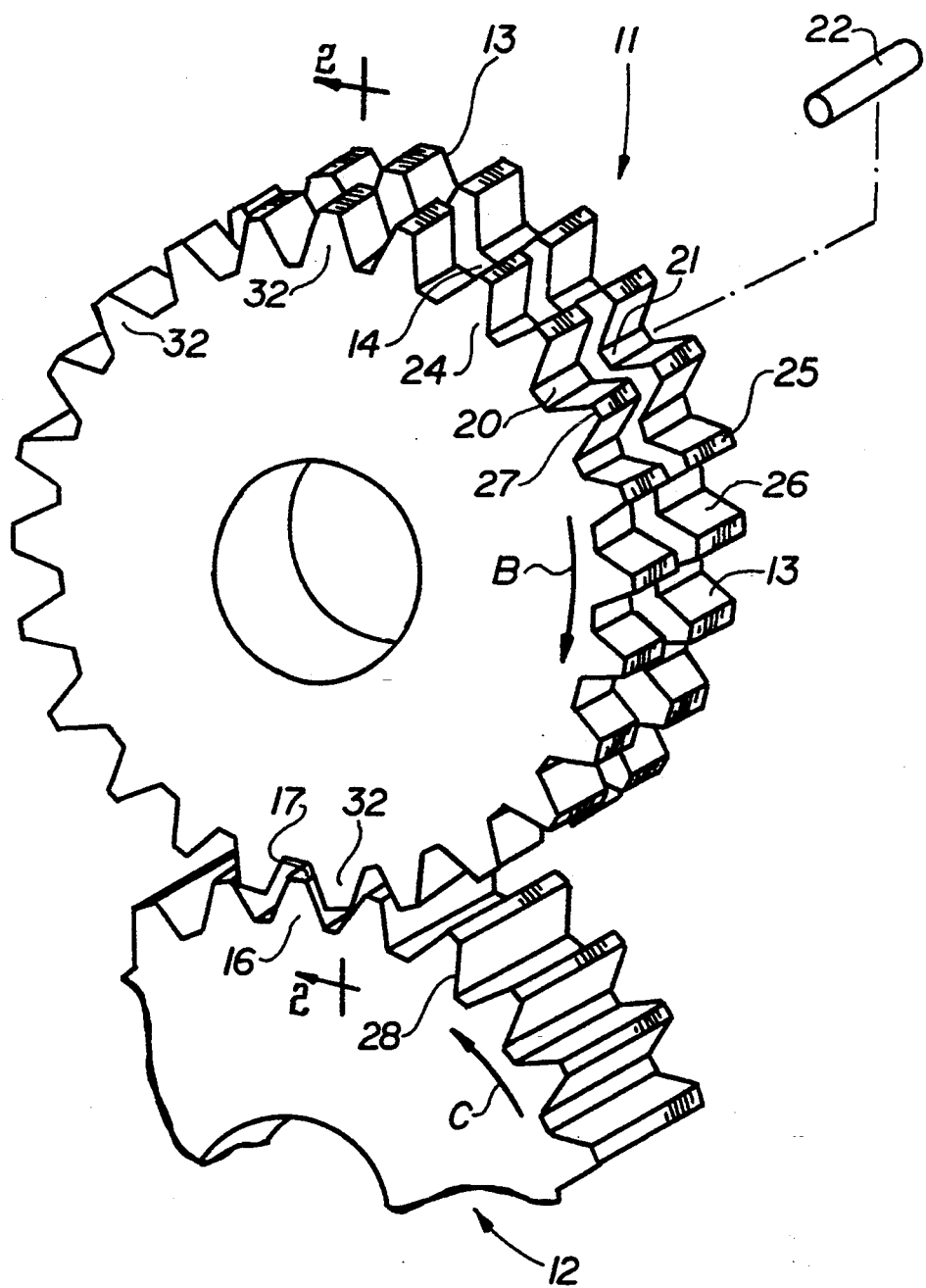
FIG. 3 is a perspective view illustrating an alternate embodiment of the invention; and, FIG. 4 is a perspective view illustrating still another embodiment of the invention.

Briefly, in accordance with my invention, I provide an improved gear assembly. The gear assembly includes a first rotating gear and a second rotating gear meshed with the first gear. The first rotating gear includes a plurality of spaced apart teeth each having a base and a distal tip; and, a plurality of detents each bounded by a pair of said bases of said teeth. The second rotating gear includes a plurality of spaced apart teeth each having a base and a distal tip. The gear assembly also includes resilient means attached to the first gear and outwardly extending from at least one of the detents bounded by the bases of a pair of the teeth of the first gear. The resilient means functions to contact the distal tips of the teeth of the first gear moving intermediate the pair of the teeth during rotation of the first and second gears; and, to facilitate the positioning of the first and second gears to set the backlash to minimize the wear of the teeth of the first and second gears.

In accordance with an alternate embodiment of my invention, I provide an improved gear assembly. The gear assembly includes a first rotating gear and a second rotating gear meshed with the first gear. The first rotating gear includes a plurality of spaced apart teeth each having a base and a distal tip; and, a plurality of detents each bounded by a pair of said bases of said teeth. The second rotating gear includes a plurality of spaced apart teeth each having a base and a distal tip. The gear assembly also includes resilient means attached to and outwardly extending from at least one of the distal tips of the teeth of the second gear. The resilient means functions to contact the detents of the first gear when, during rotation of the first and second gears, the distal tip moves intermediate the pair of the teeth bounding each of the detents; and, functions to facilitate the positioning of the gears to set the backlash to minimize the wear of the teeth of the first and second gears.

DESCRIPTION OF THE PREFERRED EMBODIMENT(S)

Turning now to the drawings, which depict the presently preferred embodiments of the invention for the purpose of illustrating the practice thereof and not by way of limitation of the scope of the invention and in which like reference characters illustrate corresponding elements throughout the several views, FIG. 1 illustrates a gear assembly constructed in accordance with the invention and including a gear 11 meshed with a pinion gear 12. Gear 11 includes a plurality of teeth 32, 13 of equal shape and dimension. Each tooth 32 includes a base 24 and a flat distal tip 27. Each tooth 13 includes a base 26 and a flat distal tip 25. Each detent 20 is bounded by the bases 24 of a pair of adjacent teeth 32. Each detent 21 is bounded by the bases 26 of a pair of adjacent teeth 13. Detents 20 and 21 each lie in a common imaginary cylindrical plane circumscribing the axis of rotation of gear 11. Each detent 20 and 21 is equidistant from the centerline or axis about which gear 11 rotates. Gear 12 includes a plurality of spaced apart teeth 16. Each tooth 16 includes a base 28 and a flat distal tip 17.

In gear 11, teeth 32 and 13 each bound a U-shaped circumferential groove 14 which receives resilient O-ring 15. When gears 11 and 12 rotate in the direction of arrows B and C, respectively, the distal tip 17 of each tooth 16 contacts the portion of O-ring which extends out of groove 14 and above the detents 20 and 21 that are located on either side of the O-ring 15. When tip 17 of a tooth 16 resiliently compresses O-ring 15, O-ring 15 generates opposing forces which act to displace gear 12 in a direction away from gear 11. O-ring 15 extends any desired distance out of groove 14. Presently, O-ring 15 extends out of groove 14 a distance sufficient to set the backlash between gears 11 and 12 in a range of about 0.001 to 0.002 inches so that there is some play between the teeth of gear 11 and the teeth of gear 12.

In an alternate embodiment of the invention, O-ring 15 is not placed in groove 14 and, instead, a cylindrical resilient member 22 is affixed to each adjacent aligned pair of detents 20 and 21 such that the distal tip 7 of each tooth of gear 12 contacts a member 22 affixed to gear 11 intermediate the bases 24, 26 of one aligned pair 32—13 of teeth and a second adjacent aligned pair 32-13 of teeth. Each resilient member 22 is sized such that when the distal ends 17 of the teeth of gear 12 contact members 22, a desired amount of backlash, or play, exists between the meshed teeth of gears 11 and 12.

In still another embodiment of the invention, an elongate resilient cylindrical member 23 is affixed to the distal tip 17 of each of the teeth 16 of gear 12. Each resilient member 23 is sized such that when the distal ends 17 of the teeth of gear 12 move intermediate and mesh with the teeth of gear 11, member 23 contacts a pair of adjacent aligned detents 20 and 21 when the desired amount of backlash exists between the meshed teeth of gears 32 and 12.

The O-ring 15 facilitates the set-up of gears 11 and 12. The user simply positions gears 11 and 12 until the distal tip 17 of a tooth 16 contacts the top of O-ring 15 and then secures in position the axles 18 on which each gear 11 and 12 is mounted. When axles 18 are secured in position, the spacing between the axis of rotation of gear 11 and the axis of rotation of gear 12 is maintained and axles 18 are free to rotate. The distal tip 17 of a tooth 16 contacting O-ring 15 is illustrated in ghost outline in FIG. 2. Each axle 18 is parallel to the other axle and the gears 11 and 12 are in the general position illustrated in FIG. 1. When the gears 11 and 12 are so positioned, the desired amount of backlash, or play, between the teeth of the gears 11 and 12 is achieved. Each gear 11 and 12 and its associated axle 18 rotates simultaneously.

Similarly, when members 22 are utilized instead of O-ring 15, gears 11 and 12 are positioned until the distal tip 17 of a tooth 16 contacts the top of resilient member 22 which is affixed to an aligned pair of detents 20 and 21 on gear 11. The axles 18 on which the gears ride are then secured in position such that the spacing between the axis of rotation of gear 11 and the axis of rotation of gear 12 is maintained and such that axles 18 can rotate. Each axle 18 is parallel to the other axle and gears 11 and 12 are in the general position illustrated in FIG. 3. When the gears 11 and 12 are so positioned, the desired amount of backlash (i.e., the spacing between the centerlines or axes of rotation of the two gears) between the gears is achieved.

Figure 4:
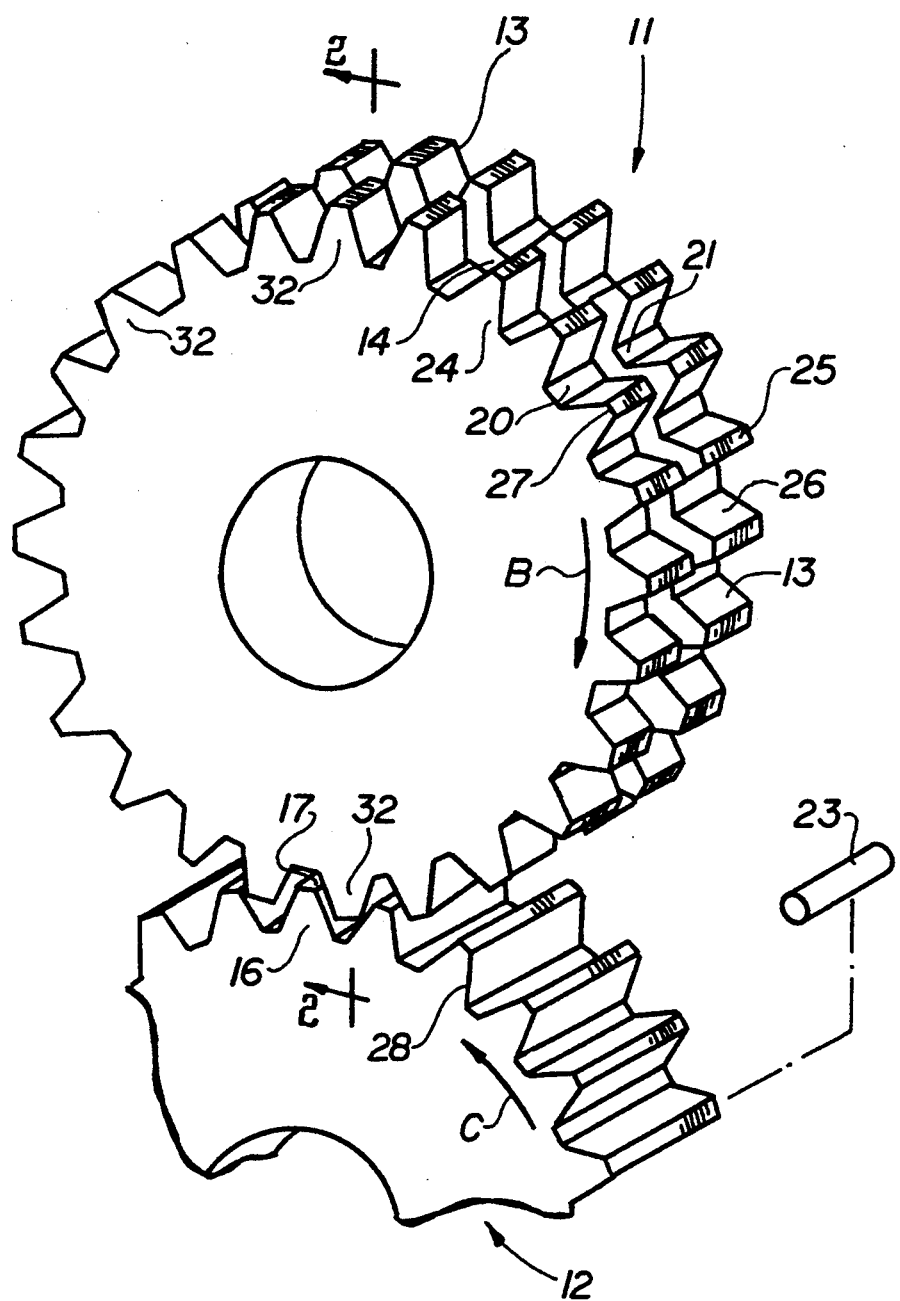

Finally, when resilient members 23 are utilized instead of O-ring 15 or members 22, gears 11 and 12 are positioned until a member 23 affixed to the tip 17 of a tooth 16 contacts a pair of aligned detents 20 and 21 on gear 11. The axles 18 on which the gears ride are then secured in position with respect to one another such that the position of gear 11 with respect to gear 12 is maintained and such that the axles can rotate. Each axle is parallel to the other axle and the gears 11 and 12 are in the general position illustrated in FIG. 4. When the gears 11 and 12 are so positioned, the desired amount of backlash between the gears is achieved.

As would be appreciated by those of skill in the art, the gear assembly of the invention can, in addition to spur gear assemblies like those illustrated in FIG. 1 herein, be utilized in connection with other gear assemblies including, without limitation, helical gear assemblies, herringbone gear assemblies, bevel gear assemblies, worm gear assemblies, planetary gear assemblies, and rack-and-pinion gear assemblies.

Having described my invention in such terms as to enable those of skill in the art to understand and practice it, and having identified the presently preferred embodiments thereof, I claim:

1. A gear assembly for facilitating setting the backlash of gears in the gear assembly, said gear assembly including
   (a) a first rotating gear including
      (i) a plurality of spaced apart teeth each having a base and a distal tip, and
      (ii) a plurality of detents each bounded by a pair of said bases of said teeth;
   (b) a second rotating gear meshed with said first gear and including a plurality of spaced apart teeth each having a base and a distal tip;
   (c) resilient means attached to said first gear and outwardly extending from at least one of said detents bounded by said bases of a pair said teeth of said first gear and including a top portion spaced outwardly apart from said one of said detents, said resilient means and said gears being shaped and dimensioned such that
      when the spacing between said first and second gears is being set up, and
      said first and second gears are positioned such that said distal tip of one of said teeth of said second gear contacts said top portion without deforming said resilient means,
      a selected amount of backlash between said first and second gears is achieved.

2. The gear assembly of claim 1 wherein said selected amount of backlash is 0.001 to 0.002 inches.

3. A gear assembly for facilitating setting the backlash of gears in the gear assembly, said gear assembly including
   (a) a first rotating gear including
      (i) a plurality of spaced apart teeth each having a base and a distal tip, and
      (ii) a plurality of detents each bounded by a pair of said bases of said teeth;
   (b) a second rotating gear meshed with said first gear and including a plurality of spaced apart teeth each having a base and a distal tip;
   (c) resilient means attached to and outwardly extending from at least one of said distal tips of said teeth of said second gear and including a top portion outwardly spaced away from said distal tip, said resilient means and said gears being shaped and dimensioned such that
      when the spacing between said first and second gears is being set up, and
      said first and second gears are positioned such that said distal tip of one of said teeth of said first gear contacts said top portion without deforming said resilient means,
      a selected amount of backlash between said first and second gears is achieved.

4. The gear assembly of claim 3 wherein said selected amount of backlash is 0.001 to 0.002 inches.

5. A gear assembly for facilitating setting the backlash of gears in the gear assembly, said gear assembly including
   (a) a first rotating gear including
      (i) a plurality of spaced apart teeth each having a base and a distal tip, and
      (ii) a plurality of detents each bounded by a pair of said bases of said teeth;
   (b) a second rotating gear meshed with said first gear and including a plurality of spaced apart teeth each having a base and a distal tip;
   (c) resilient means attached to said first gear and outwardly extending from at least one of said detents of said first gear, said resilient means and said gears being shaped and dimensioned such that when the spacing between said first and second gears is being set up, and said first and second gears are positioned such that said distal tip of one of said teeth of said second gear contacts said top portion without deforming said resilient means, a selected amount of backlash between said first and second dears is achieved.

6. The gear assembly of claim 5 wherein said selected amount of backlash is 0.001 to 0.002 inches.

* * * * *